United States Patent
Pariente

(10) Patent No.: US 7,802,257 B1
(45) Date of Patent: Sep. 21, 2010

(54) MECHANISM FOR BRIDGING A THREAD-ORIENTED COMPUTING PARADIGM AND A JOB-ORIENTED COMPUTING PARADIGM

(75) Inventor: Frederic M. Pariente, Toulouse (FR)

(73) Assignee: Oracle America, Inc., Redwood Shores, CA (US)

( * ) Notice: Subject to any disclaimer, the term of this patent is extended or adjusted under 35 U.S.C. 154(b) by 1493 days.

(21) Appl. No.: 11/157,665

(22) Filed: Jun. 20, 2005

(51) Int. Cl.
*G06F 9/46* (2006.01)
*G06F 15/173* (2006.01)

(52) U.S. Cl. .............. 718/104; 718/100; 718/102; 709/223; 709/225; 709/226

(58) Field of Classification Search .......... 718/100, 718/104, 108, 102; 702/188; 709/227, 226; 710/242; 713/185
See application file for complete search history.

(56) References Cited

U.S. PATENT DOCUMENTS

| | | | | |
|---|---|---|---|---|
| 6,144,984 | A * | 11/2000 | DeBenedictis et al. | 718/106 |
| 6,275,810 | B1 * | 8/2001 | Hetherington et al. | 705/9 |
| 6,842,900 | B2 * | 1/2005 | Sakamoto | 718/102 |
| 7,003,770 | B1 * | 2/2006 | Pang et al. | 718/100 |
| 7,069,185 | B1 * | 6/2006 | Wilson et al. | 702/188 |
| 7,171,654 | B2 * | 1/2007 | Werme et al. | 717/130 |
| 7,380,039 | B2 * | 5/2008 | Miloushev et al. | 710/244 |
| 7,467,303 | B2 * | 12/2008 | Keohane et al. | 713/185 |
| 7,526,515 | B2 * | 4/2009 | Broussard et al. | 1/1 |
| 7,574,707 | B2 * | 8/2009 | Bozak et al. | 717/176 |
| 2001/0056457 | A1 * | 12/2001 | Kikuchi et al. | 709/104 |
| 2003/0126260 | A1 * | 7/2003 | Husain et al. | 709/225 |
| 2003/0158832 | A1 * | 8/2003 | Sijacic et al. | 707/1 |
| 2004/0068553 | A1 * | 4/2004 | Davis et al. | 709/218 |
| 2004/0103342 | A1 * | 5/2004 | Moser et al. | 714/6 |
| 2004/0215780 | A1 * | 10/2004 | Kawato | 709/226 |
| 2005/0055419 | A1 * | 3/2005 | Oh | 709/213 |
| 2005/0060432 | A1 * | 3/2005 | Husain et al. | 709/246 |
| 2005/0076339 | A1 * | 4/2005 | Merril et al. | 718/104 |

(Continued)

OTHER PUBLICATIONS

Narayan, Ranjani, "POSIX pthread (Draft 10) APIs," HP Technical Document, located on the internet at <docs.hp.com/en/30216-90328/ch06s11.html>, retrieved on Oct. 21, 2005, 3 pages.

(Continued)

*Primary Examiner*—Li B Zhen
*Assistant Examiner*—Abdullah Al Kawsar
(74) *Attorney, Agent, or Firm*—Osha • Liang LLP

(57) ABSTRACT

A mechanism is provided for fostering the adoption of grid computing by bridging the thread-oriented paradigm (used in single and multi-processor computers) and the job-oriented paradigm (used in grid computing). This mechanism allows an application developer to write an application in the same manner as if he were writing a thread-oriented program (in terms of creating and joining threads). However, when the application is executed on a client computer and the mechanism is invoked, the mechanism interacts with a resource management interface to cause a distributed resource manager to create, distribute, and manage the execution of jobs on the resource computers of a grid. Thus, rather than actually spawning threads on the client computer, the mechanism causes jobs to be spawned and executed on the grid. By doing this, the mechanism allows the application to take advantage of grid computing without requiring the application to be grid-aware.

16 Claims, 10 Drawing Sheets

U.S. PATENT DOCUMENTS

| | | | |
|---|---|---|---|
| 2005/0172291 A1* | 8/2005 | Das et al. | 718/104 |
| 2005/0235286 A1* | 10/2005 | Ballew et al. | 718/100 |
| 2006/0101467 A1* | 5/2006 | Buco et al. | 718/102 |
| 2006/0112181 A1* | 5/2006 | Affaki | 709/227 |
| 2006/0143350 A1* | 6/2006 | Miloushev et al. | 710/242 |

OTHER PUBLICATIONS

Rajic, Hrabi et al., "Distributed Resource Management Application API Specification 1.0," Global Grid Forum Working Draft, GFD.022, Jun. 2004, pp. 1-29.

* cited by examiner

Pthread Library pthread_attr_init
pthread_attr_set...
pthread_create
pthread_join
pthread_attr_destroy

*Fig. 1*

DRMAA Library drmaa_allocate_job_template
drmaa_set_attribute
drmaa_set_vector_attribute
drmaa_run_job
drmaa_wait
drmaa_wifexited
drmaa_wexitstatus
drmaa_delete_job_template

*Fig. 2*

Dthread Library dthread_attr_init
dthread_attr_set
dthread_create
dthread_join
dthread_attr_destroy

*Fig. 3*

| Dthread Library | DRMAA Method(s) |
|---|---|
| dthread_attr_init | drmaa_allocate_job_template |
| | drmaa_set_attribute |
| | drmaa_set_attribute |
| dthread_attr_set | drmaa_set_attribute |
| dthread_create | drmaa_set_attribute |
| | drmaa_set_vector_attribute |
| | drmaa_run_job |
| dthread_join | drmaa_wait |
| | drmaa_wifexited |
| | drmaa_wexitstatus |
| dthread_attr_destroy | drmaa_delete_job_template |

Fig. 4

MECHANISM FOR BRIDGING A THREAD-ORIENTED COMPUTING PARADIGM AND A JOB-ORIENTED COMPUTING PARADIGM

BACKGROUND

Many of today's operating systems provide multi-threaded capability. With this capability, an operating system is able to support concurrent execution of multiple sets of code, multiple concurrent executions of the same set of code, or both.

In a computer having a single processor, the practical effect of multi-threading is that the multiple threads share the processor. Since the processor can execute only one thread at a time, the processor will execute one thread to a certain execution point or for a certain period of time. The processor then performs a context switch and begins executing another thread. The processor will execute that thread until a certain execution point is reached or until a time limit has been reached. The processor then performs another context switch and begins executing another thread. This other thread may be the previous thread, or it may be another thread. By switching from thread to thread in this manner, the processor services each thread and provides the impression that the multiple threads are being executed concurrently.

In a computer having multiple processors, the execution of the various threads can be truly concurrent. For example, if a computer has five processors and there are currently five threads executing in the computer, then each processor can be executing one of the threads. Since each processor has the processing resources to execute its own thread, the multiple threads can be truly executed concurrently and in parallel. Many of today's high power computers are multi-processor computers. These multi-processor computers provide the processing power needed to execute some of today's more resource-intensive programs.

One of the drawbacks of multi-processor computers is that they are not as scalable as would be desired. Multi-processor computers can accommodate only a finite number of processors, typically in the 16-32 processor range, which may not be enough for heavy computation. For this and other reasons, there has been a movement in recent times away from large multi-processor computers towards a grid-based computing model.

In a computing grid, a plurality of individual resource computers are coupled together via one or more networks. Each of these resource computers may be a single processor computer or a multi-processor computer. Access to the processing resources of the resource computers is controlled by a distributed resource manager (DRM). When a client computer has a job to be run, it submits the job to the DRM. In response, the DRM selects one (or more) of the resource computers, and assigns the job to that resource computer to be run thereon. After the job is completed, the DRM receives the results of the job from the resource computer and passes the results back to the client computer. In this manner, the DRM acts as the access point to the grid, and utilizes the resources in the computing grid to execute jobs. During a busy time, a client computer may submit multiple jobs to the DRM, which in turn, may assign those jobs to various resource computers for execution thereon. During a slow time, a client computer may submit very few or even no jobs to the DRM. As shown by this discussion, a computing grid provides a client computer with great computing flexibility and scalability. No longer does the client computer have to provide all of its own computing resources. Rather, it can call upon the computing resources of the grid as needed.

While grid computing provides many advantageous, its adoption by large enterprises has been relatively slow. There have been several reasons for this slow adoption. One reason has been the lack of a standard interface for invoking the functionalities of the DRM. Different DRM makers have implemented different proprietary interfaces. Because of this, application developers have not been able to develop applications that are compatible with all DRM's. Instead, they have been forced to tailor their applications for specific DRM's. This has slowed the development of applications that are grid-aware/grid-compatible. To rectify this situation, an organization known as the Global Grid Forum has created a standard interface known as DRMAA (distributed resource management application API) for invoking the functionalities of a DRM. If all DRM makers start conforming to this standard, then it will be possible for application developers to write applications that are compatible with all DRM's.

Another reason for the slow adoption of grid computing has been the fact that grid computing represents a significant change in computing paradigm. The current prevailing computing paradigm (the one used in single and multi-processor computers) is thread-oriented. Under this paradigm, when an application wishes to have a set of code executed concurrently with itself, it makes a call to the operating system to create another thread and to use that thread to concurrently execute the set of code. Because all threads created by an operating system are assumed to run in the same computer in the same process space, the application can make liberal use of logical constructs, such as pointers, that are valid only within a process space of a particular computer. The same cannot be done in a grid computing environment. In a grid, it is not known beforehand which resource computer will be selected by the DRM to execute a job. Thus, computer and/or process space specific assumptions cannot be made. As a result, the thread-oriented paradigm cannot be used across a grid.

Instead, in grid-based computing, a job-oriented paradigm is used. With the job-oriented paradigm, each request to execute a set of code is packaged as a job in such a way that it is more self-contained. By doing so, it is possible for the DRM to assign the job to any resource computer for execution thereon. The packaging of a request is just one of the differences between the thread-oriented paradigm and the job-oriented paradigm. There are many other significant differences. Because of these differences, it is not possible for an application written in accordance with the thread-oriented paradigm to operate in a job-oriented paradigm unless significant changes are made to the application. Because such extensive changes would require a significant investment in resources, very few existing applications have been altered to make them job-oriented, and hence, grid-aware/grid-compatible.

Yet another reason for the slow adoption of grid computing has been that most application developers are accustomed to programming in the thread-oriented paradigm. To write grid-aware applications, developers would have to change from their current paradigm to the job-oriented paradigm. This requires significant investment on the part of the developers, and is difficult to do. Because of this, relatively few grid-aware/grid-compatible applications have been developed.

SUMMARY

In accordance with one embodiment of the present invention, to foster the adoption of grid computing, a mechanism is provided for bridging the thread-oriented paradigm and the job-oriented paradigm. In one embodiment, this mechanism takes the form of a "distributed thread" (dthread) library comprising a plurality of methods (or functions) that can be invoked by applications. This library, which acts as an application programming interface (API), allows an application developer to write an application in the same manner as if he were writing a thread-oriented program. More specifically, the application can be written in terms of creating and joining threads. However, when the application is executed on a client computer and the dthread library is invoked by the application, the methods of the dthread library do not spawn threads of execution as is usually done in the thread-oriented paradigm. Instead, the methods of the dthread library interact with a resource management interface to cause a DRM to create, distribute, and manage execution of jobs on the resource computers of a grid. Thus, rather than actually spawning threads and executing those threads on the client computer, the dthread library causes jobs to be spawned and executed on the resource computers of the grid. By doing this, the dthread library allows the application to take advantage of grid computing without requiring the application to be written in such a way that it is grid-aware (note: the application does not know it is interacting with a grid at all). By providing this capability, the dthread library will ease the transition into the grid-oriented paradigm, and will foster the proliferation of grid computing.

BRIEF DESCRIPTION OF THE DRAWINGS

FIG. 1 shows some of the methods in a standard pthread library.

FIG. 2 shows some of the methods in a standard DRMAA library.

FIG. 3 shows some of the methods in a dthread library, in accordance with one embodiment of the present invention.

FIG. 4 shows a sample mapping between the methods of the dthread library of FIG. 3 and the DRMAA library of FIG. 2, in accordance with one embodiment of the present invention.

DETAILED DESCRIPTION OF EMBODIMENT(S)

Background Information

Figure 5:
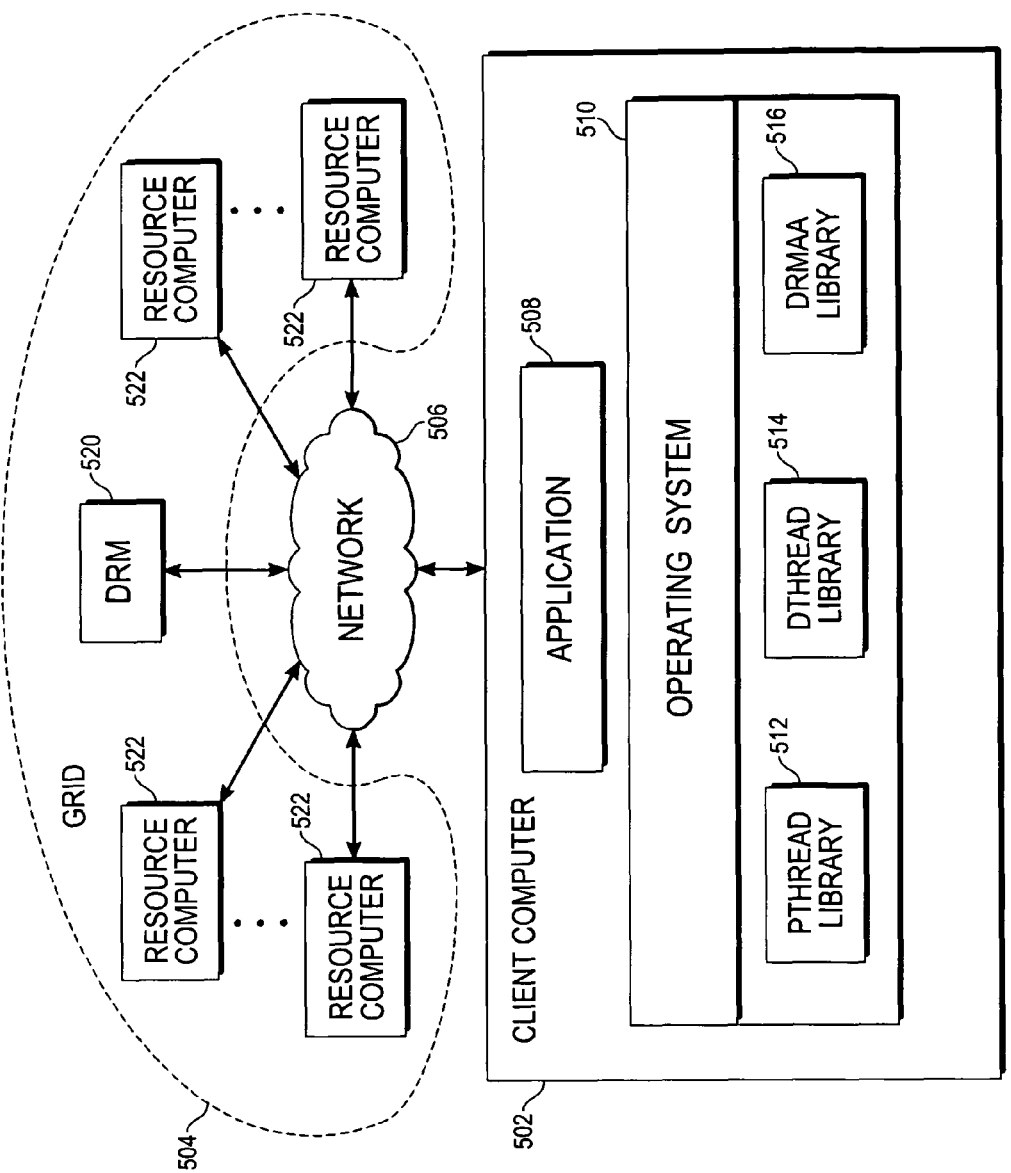
FIG. 5 is a functional block diagram of a sample system in which one embodiment of the present invention may be implemented.

Before describing an embodiment of the present invention in detail, some additional background information will first be provided to facilitate a complete understanding of the invention.

Pthread Library

As noted previously, many current operating systems support multi-threaded operation. In many of these operating systems, a pthread library (which conforms to a well-know POSIX standard) is provided to support multi-threaded operation in a multi-processor computer. This library provides a plurality of methods/functions/routines that can be invoked by applications. In effect, the pthread library acts as an API for enabling applications to call upon the multi-threaded capability of the operating system. Some of the methods of the pthread library are shown in FIG. 1. These methods include: (1) a pthread_attr_init method; (2) a series of methods whose names start with pthread_attr_set; (3) a pthread_create method; (4) a pthread_join method; and (5) a pthread_attr_destroy method. The following discussion illustrates how these methods may be used by an application executing in a multi-processor computer.

When an application invokes the pthread_attr_init method, the operating system creates an attribute data structure that can be used to store one or more attributes associated with a thread. Once this attribute data structure is created, the application may invoke one or more of the pthread_attr_set . . . methods one or more times, each time specifying an attribute/value pair to be stored within the attribute data structure. After the attributes of a thread are specified, the application may invoke the pthread_create method to cause the operating system to create a new thread, associate the attribute data structure with the new thread, and use the new thread to execute another set of code, such as a function, a subroutine, a method, etc. (the other set of code to be executed is specified in the pthread_create method invocation). The new thread may be (and often is) executed by a different processor than the processor currently executing the application.

At some point, the application may wish to obtain the results of the execution of the other set of code. To do so, the application invokes the pthread_join method to cause the operating system to join the thread executing the other set of code with the main thread executing the application. After the threads are joined, the application may wish to do some cleanup to release memory that is no longer needed. To do so, the application may invoke the pthread_attr_destroy method. When this method is invoked, the operating system destroys the attribute data structure that was created as a result of the pthread_attr_init method invocation. The memory associated with the attribute data structure is thus freed and made reusable. In this manner, an application may use the pthread library to take advantage of the multi-threaded capability of the operating system in a multi-processor computer.

Resource Management Interface

The pthread library is used by an application to implement multi-threading inside a multi-processor computer. To implement job execution in a computing grid, an application would use a completely different library, referred to herein as a resource management interface. Like the pthread library, this resource management interface is an API which comprises a plurality of methods/functions/routines that can be invoked by applications. Unlike the pthread library, however, the resource management interface does not implement multi-threading within a multi-processor computer. Rather, it interacts with a DRM to submit, monitor, and receive results from jobs executed on a computing grid. Thus, instead of operating under a thread-oriented paradigm, the resource management interface operates under a job-oriented paradigm. Because these two libraries operate under very different paradigms, applications written to invoke one library cannot invoke the other library without significant changes being made to the applications. To invoke the resource management interface directly, an application needs to be grid-aware.

An example of a resource management interface is the DRMAA interface developed by the Global Grid Forum (mentioned previously). DRMAA provides a standard interface to which application developers can program. If a DRM conforms to the DRMAA standard, then an application written to invoke the DRMAA interface will be able to interact with that DRM. FIG. 2 shows some of the methods in the DRMAA interface. These methods are invoked by an application running on a client computer to interact with a DRM to submit, monitor, and receive results from jobs executed on a computing grid. The operation of these methods will be described in greater detail in a later section.

Bridging Thread-Oriented and Job-Oriented Paradigms

As noted above, applications written in accordance with a thread-oriented paradigm to invoke the pthread library cannot be easily changed to invoke a resource management interface (e.g. DRMAA) in accordance with a job-oriented paradigm. To bridge these two paradigms, one embodiment of the present invention provides a dthread library. Like the pthread library and the resource management interface, the dthread library is an API comprising a plurality of methods/functions/routines that can be invoked by applications.

Dthread Library

FIG. 3 shows some of the methods of the dthread library, in accordance with one embodiment of the present invention. As shown in FIG. 3, the dthread library comprises: (1) a dthread_attr_init method; (2) a dthread_attr_set method; (3) a dthread_create method; (4) a dthread_join method; and (5) a dthread_attr_destroy method. Notice that the names of these methods closely parallel those of the pthread library shown in FIG. 1. In fact, the only difference is that the methods in FIG. 3 start with a "dthread" instead of a "pthread".

While the names of the methods of the dthread library are similar to the names of the methods of the pthread library, their functionalities are quite different. Rather than implementing multi-threaded functionality within a multi-processor computer, as is done by the pthread library, the methods of the dthread library invoke the methods of the resource management interface (e.g. DRMAA) to interact with a DRM to submit, monitor, and receive results from jobs executed on a computing grid. Thus, even though the methods look like they are thread-oriented methods, in actuality, they interact with the resource management interface to implement a job-oriented paradigm. Effectively, the dthread library shields an application developer from the specifics and complexities of the resource management interface. The dthread library allows the application developer to continue to think and program in terms of the thread-oriented paradigm; yet, when the application is executed and the methods of the dthread library are invoked, a job-oriented paradigm is actually implemented. In effect, the dthread library converts thread-oriented method calls into job-oriented method calls to enable the application developer to write applications that are thread-oriented and grid-unaware but still enjoy the benefits of grid computing.

The similarity between the pthread and the dthread methods gives rise to at least two significant benefits. First, it makes it easy to convert a current application that invokes the pthread library into a new application that invokes the dthread library. The main thing that has to be done is to change each occurrence of pthread to dthread (some minor changes may also have to be made to the parameters that are provided with the method calls). Thus, existing thread-oriented applications can be relatively easily transformed into job-oriented, grid-enabled applications (note: applications that invoke the dthread library are grid-enabled but they are not grid-aware). Second, the similarity makes it simple for a developer accustomed to writing applications that invoke the pthread library to switch to writing applications that invoke the dthread library. With no major syntax differences, and the outward appearance of a thread-oriented paradigm, the dthread library does not impose much of a burden on the developer to learn anything new. Thus, application developers face very few barriers to developing grid-enabled applications. The two benefits mentioned above will likely cause more existing applications to be converted to grid-enabled applications, and cause more new grid-enabled applications to be developed. Both of these results will foster greater adoption of grid computing.

At this point, it should be noted that while the similarity between the pthread and dthread libraries gives rise to significant benefits, such similarity is not required. If so desired, the methods of the dthread library may be significantly different from the methods of the pthread library. This and other modifications are within the scope of the present invention.

As noted above, when a method of the dthread library is invoked, it invokes one or more methods of the resource management interface. FIG. 4 shows a sample mapping between the methods of the dthread library and the methods of a resource management interface, in accordance with one embodiment of the present invention. In the sample shown in FIG. 4, the resource management interface is assumed for the sake of illustration to be the DRMAA interface. It should be noted, though, that if so desired, the methods of the dthread library may be mapped to other methods of other resource management interfaces.

As shown in FIG. 4, when the dthread_attr_init method is invoked, it invokes the drmaa_allocate_job_template method of the DRMAA interface once, and the drmaa_set_attribute method twice. When the dthread_attr_set method is invoked, it invokes the drmaa_set_attribute method. When the dthread_create method is invoked, it invokes the drmaa_set_attribute method, the drmaa_set_vector_attribute method, and the drmaa_run_job method. When the dthread_join method is invoked, it invokes the drmaa_wait method, the drmaa_wifexited method, and the drmaa_wexitstatus method. When the dthread_attr_destroy method is invoked, it invokes the drmaa_delete_job_template method. The significance of these mappings, and the manner in which the dthread library interacts with the DRMAA interface, will be elaborated upon in a later section.

In one embodiment, in addition to the methods shown in FIGS. 2-4, the dthread library 514 further comprises an _init( ) method and a _fini( ) method, and the DRMAA library 516 further comprises a drmaa_init method and a drmaa_exit method. When an application interacts with the dthread library 514 for the first time, thereby causing the dthread library 514 to be loaded, the _init( ) method of the dthread library 514 is executed, which in turn invokes the drmaa_init method of the DRMAA library 516. Invocation of the drmaa_init method causes a session to be opened and initialized with the DRM 520. When the application terminates, thereby causing the dthread library 514 to be unloaded, the _fini( )method of the dthread library 514 is executed, which in turn invokes the drmaa_exit method of the DRMAA library 516. Invocation of the drmaa_exit method causes some cleanup operations to be performed, and causes the session with the DRM 520 to be closed. Through the use of the _init ( ) and _fini( ) methods, it is possible to shield the application from the management of the underlying connection with the DRM 520.

System Overview

With reference to FIG. 5, there is shown a functional block diagram of a sample system in which one embodiment of the present invention may be implemented. As shown, the system comprises a client computer 502, a computing grid 504, and a network 506 for communicatively coupling the client computer 502 to the grid 504. The grid 504 comprises a plurality of resource computers 522. Each of the resource computers 522 is an individual computer which may have a single processor or multiple processors. Each resource computer 522 may also comprise other resources, such as storage, memory, I/O devices, etc. Access to the resource computers 522 is controlled by a DRM 520. In one embodiment, it is the DRM 520 that interacts with the client computer 502 to manage the creation of jobs, the distribution of jobs to the resource computers 522, and the return of job results to the client computer 502. Overall, the DRM 520 acts as the access point to the grid 504. For the sake of illustration, the DRM 520 is shown as an individual component in the grid 504. However, if so desired, the DRM 520 may be incorporated into one of the resource computers 522 or even into the client computer 502. These and other modifications are within the scope of the present invention.

The client computer 502 comprises an operating system 510 and one or more applications 508 (only one application is shown for the sake of simplicity). Plugged into the operating system 510 are a pthread library 512, a dthread library 514, and a DRMAA library 516. In one embodiment, these libraries 512, 514, 516 provide the methods that were previously discussed with reference to FIGS. 1-3. To invoke the methods provided by these libraries, the application 508 makes calls to the operating system 510. In turn, the operating system 510 invokes the proper methods in the proper libraries.

Sample Operation

To facilitate a complete understanding of the present invention, a sample operation of the dthread library 514 will now be described with reference to the sample system shown in FIG. 5.

Figure 6:
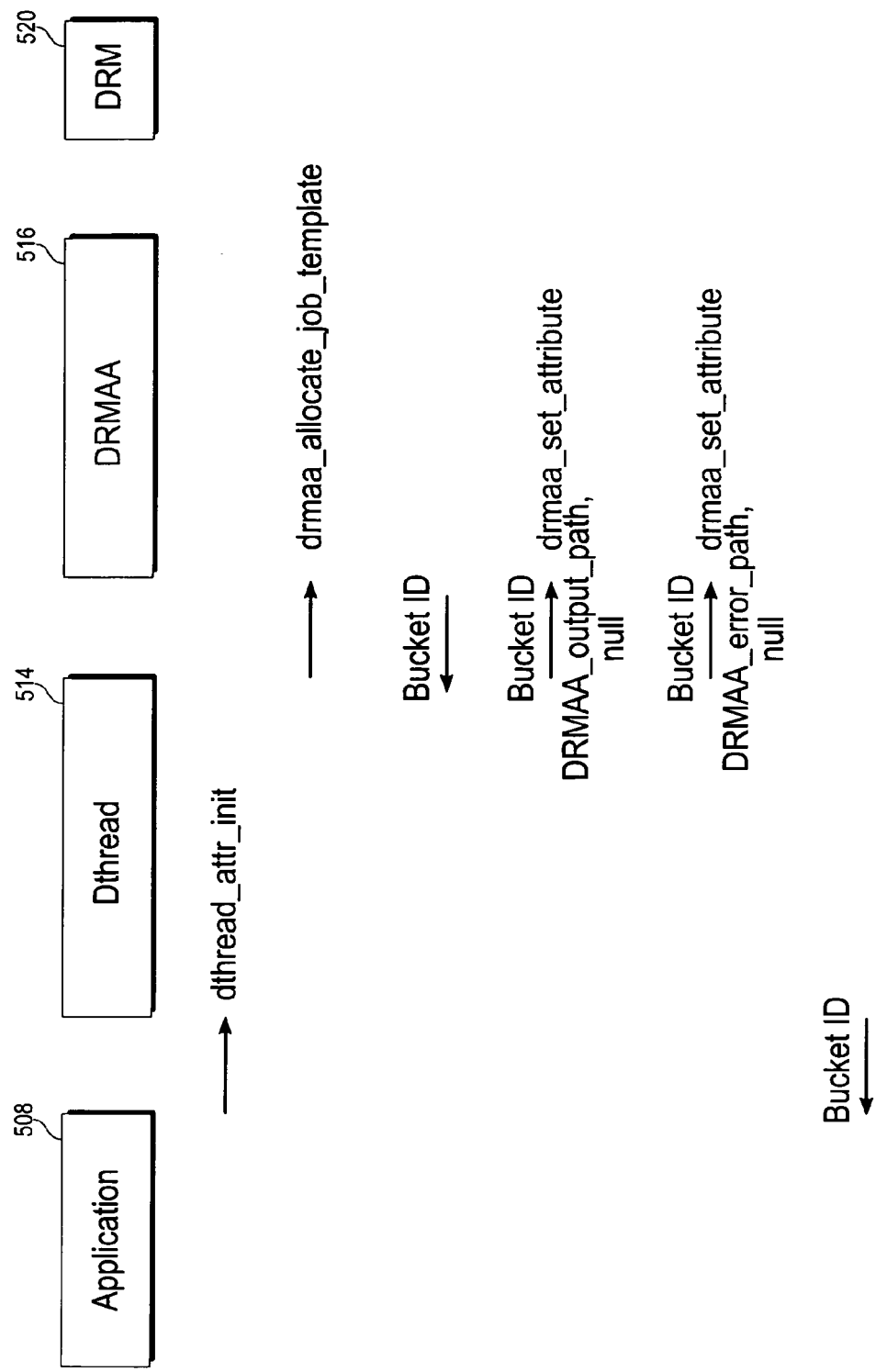
FIG. 6 shows a sample implementation of the dthread_attr_init method of the dthread library, in accordance with one embodiment of the present invention.

Suppose that application 508 is currently executing on the client computer 502 using a particular thread. Suppose further that the application 508 arrives at a point in its execution where it wishes to spawn a new thread to execute another set of code (e.g. a function) concurrently with itself. Before it spawns this new thread, however, the application 508 wishes to specify some attributes for the new thread. To do so, the application 508 first invokes the dthread_attr_init method of the dthread library 514 to create a data structure in which the attributes of the new thread may be stored. This invocation is shown in FIG. 6. In response to this invocation, the dthread_attr_init method does not actually create a data structure. Instead, it invokes the drmaa_allocate_job_template method of the DRMAA library 516. In response, the drmaa_allocate_job_template method creates a data structure (referred to herein as a "bucket") within the client computer 502 for storing the attributes of a new job, and assigns it a bucket ID. This bucket ID is returned to the dthread_attr_init method.

After receiving the bucket ID, the dthread_attr_init method, in one embodiment, proceeds to set two attributes (more attributes could be set if so desired) of the job to default values. To do so, the dthread_attr_init method invokes the drmaa_set_attribute method of the DRMAA library 516 twice. In the first invocation, the dthread_attr_init method provides the bucket ID, the name of an attribute (in this case, "DRMAA_output_path"), and a value for the attribute (in this case, "null"). This causes the drmaa_set_attribute method to store the attribute/value pair "DRMAA_output_path" and "null" inside the bucket, thereby setting the path to an output file to "null". In the second invocation, the dthread_attr_init method provides the bucket ID, the name of an attribute (in this case, "DRMAA_error_path"), and a value for the attribute (in this case, "null"). This causes the drmaa_set_attribute method to store the attribute/value pair "DRMAA_error_path" and "null" inside the bucket, thereby setting the path to an error file to "null". After this is done, the bucket (i.e. the new job template) is initialized, and the dthread_attr_init method returns the bucket ID to the application 508. The application 508 believes this ID to be a pointer to a data structure created by the dthread_attr_init method that stores the attributes for a new thread.

Figure 7:
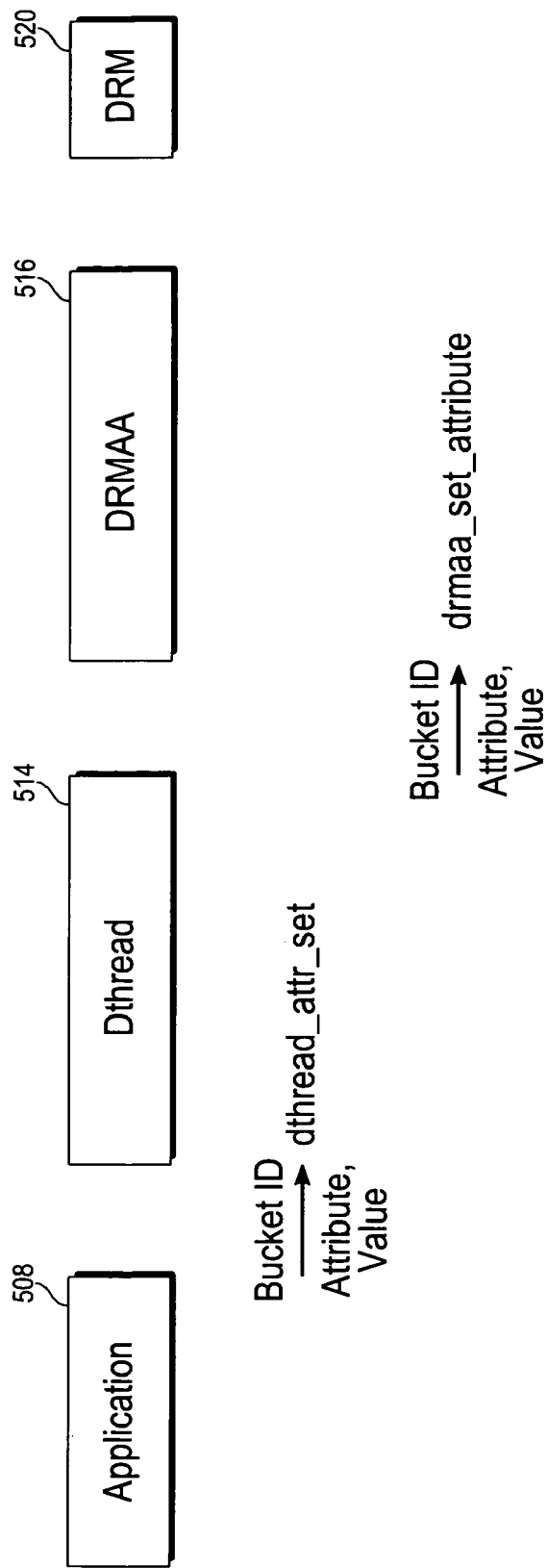
FIG. 7 shows a sample implementation of the dthread_attr_set method of the dthread library, in accordance with one embodiment of the present invention.

After calling the dthread_attr_init method, the application 508 may wish to specify values for one or more attributes of the new thread. To do so, the application 508 calls the dthread_attr_set method of the dthread library 514 (see FIG. 7). Each time the application 508 calls the dthread_attr_set method, it provides the bucket ID, the name of an attribute, and a value for the attribute. In response, the dthread_attr_set method invokes the drmaa_set_attribute method of the DRMAA library 516, and provides thereto the bucket ID, the name of an attribute, and a value. In some instances, the name of an attribute provided by the application 508 may not be the name of an attribute recognized by the DRMAA standard. In such a case, the dthread_attr_set method has sufficient logic to convert the attribute name into one that is recognized by DRMAA. The same conversion may be done for the attribute value, if necessary. In response to being invoked, the drmaa_set_attribute method stores the attribute/value pair provided by the dthread_attr_set method into the previously created bucket.

Figure 8:
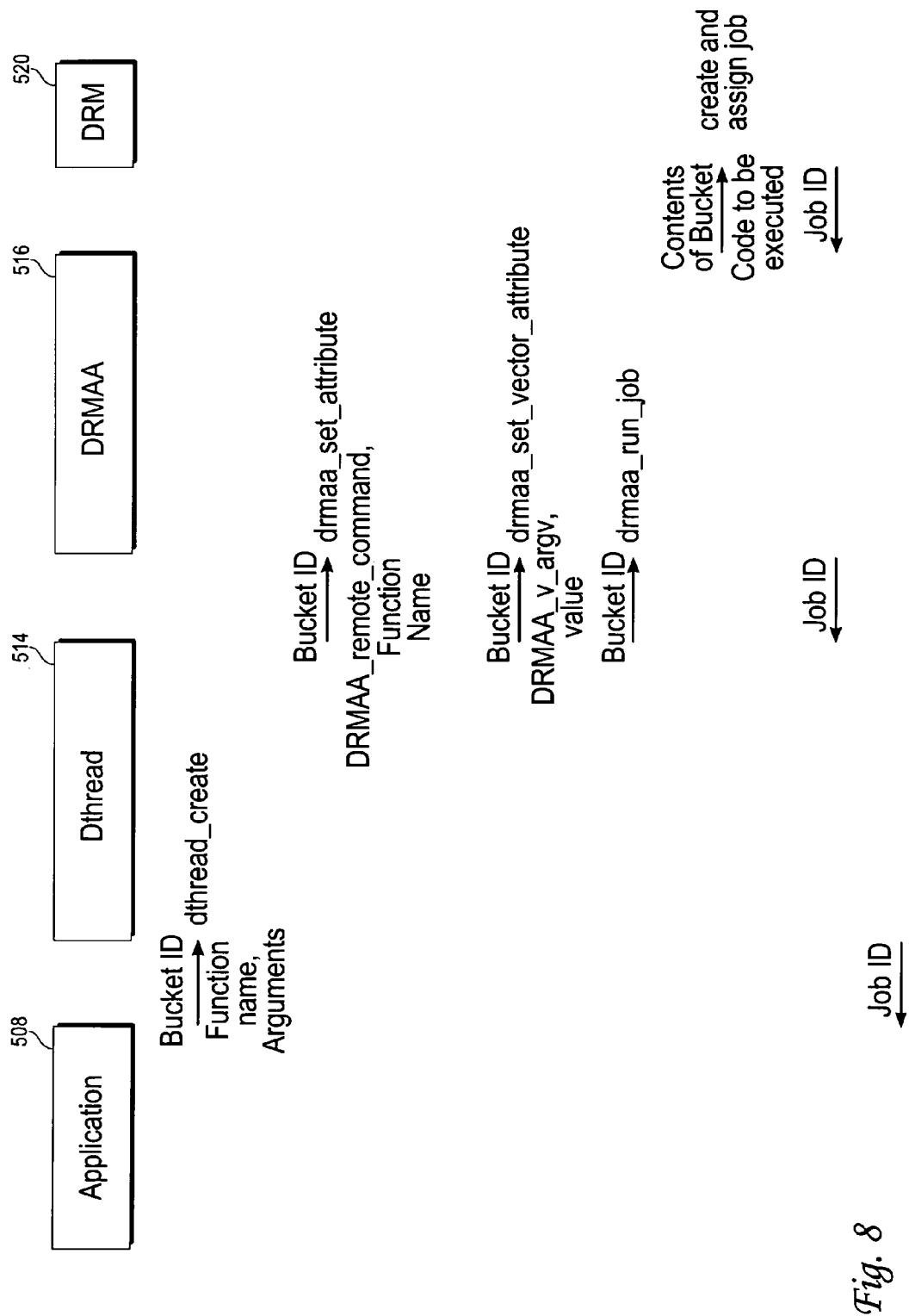
FIG. 8 shows a sample implementation of the dthread_create method of the dthread library, in accordance with one embodiment of the present invention.

The application 508 may call the dthread_attr_set method zero or more times to specify zero or more attribute values for the new thread. After it has specified all of the desired attribute values, the application 508 calls the dthread_create method of the dthread library 514 to create a new thread to execute another set of code concurrently with itself (see FIG. 8). In making the dthread_create call, the application 508 provides the bucket ID, the name of a set of code (e.g. the name of a function) to be executed, and a reference to an array of zero or more arguments to be used in executing the set of code. In one embodiment, the name of the set of code is recognized as a string and not as a pointer.

In response to being invoked, the dthread_create method, in one embodiment, invokes several methods of the DRMAA library 516. First, it invokes the drmaa_set_attribute method. In this invocation, the dthread_create method provides the bucket ID, the attribute name "DRMAA_remote_command", and the function name ("foo", for example) provided by the application 508 as part of the dthread_create method call. Basically, this invocation causes the drmaa_set_attribute method to store information within the bucket indicating that the program or command that is to be executed by the job is named "foo".

In addition, the dthread_create method invokes the drmaa_set_vector_attribute method. As part of this invocation, the dthread_create method provides the bucket ID, the attribute name "DRMAA_v_argv", and the reference to the array of arguments provided by the application 508 as part of the dthread_create method call. This invocation causes the drmaa_set_vector_attribute method to store information within the bucket indicating where the arguments for the program to be executed can be obtained.

After that is done, the dthread_create method invokes the drmaa_run_job method, and provides the bucket ID. In response to this invocation, the drmaa_run_job method accesses the bucket referenced by the bucket ID, and extracts all of the information stored therein. From the information contained in the bucket, the drmaa_run_job method determines (from the "DRMAA_remote_command" attribute) which set of code (e.g. the function "foo") is to be executed by the job, and locates and obtains that set of code (in one embodiment, the set of code is resident on the client computer 502). In addition, the drmaa_run_job method locates and obtains the array that contains the arguments to be used in executing the set of code. The drmaa_run_job method packages the set of code, the arguments, some or all of the attributes and values in the bucket, and possibly other information in the bucket, and sends the package to the DRM 520. In response, the DRM 520 creates a new job, assigns it a job ID, and assigns the job to one (or more) of the resource computers 522 in the grid 504 to be executed thereon. The set of code is thus caused to be executed on the grid 504. Thereafter, the DRM 520 returns the job ID to the drmaa_run_job method, which in turn, returns the job ID to the dthread_create method, which in turn, returns the job ID to the application 508. The application 508 believes this ID to be an ID of a thread that is executing the set of code on the client computer 502. Unbeknownst to the application 508, however, the set of code is not being executed by a thread on the client computer 502 but rather by one (or more) of the resource computers 522 on the grid 504.

Figure 9:
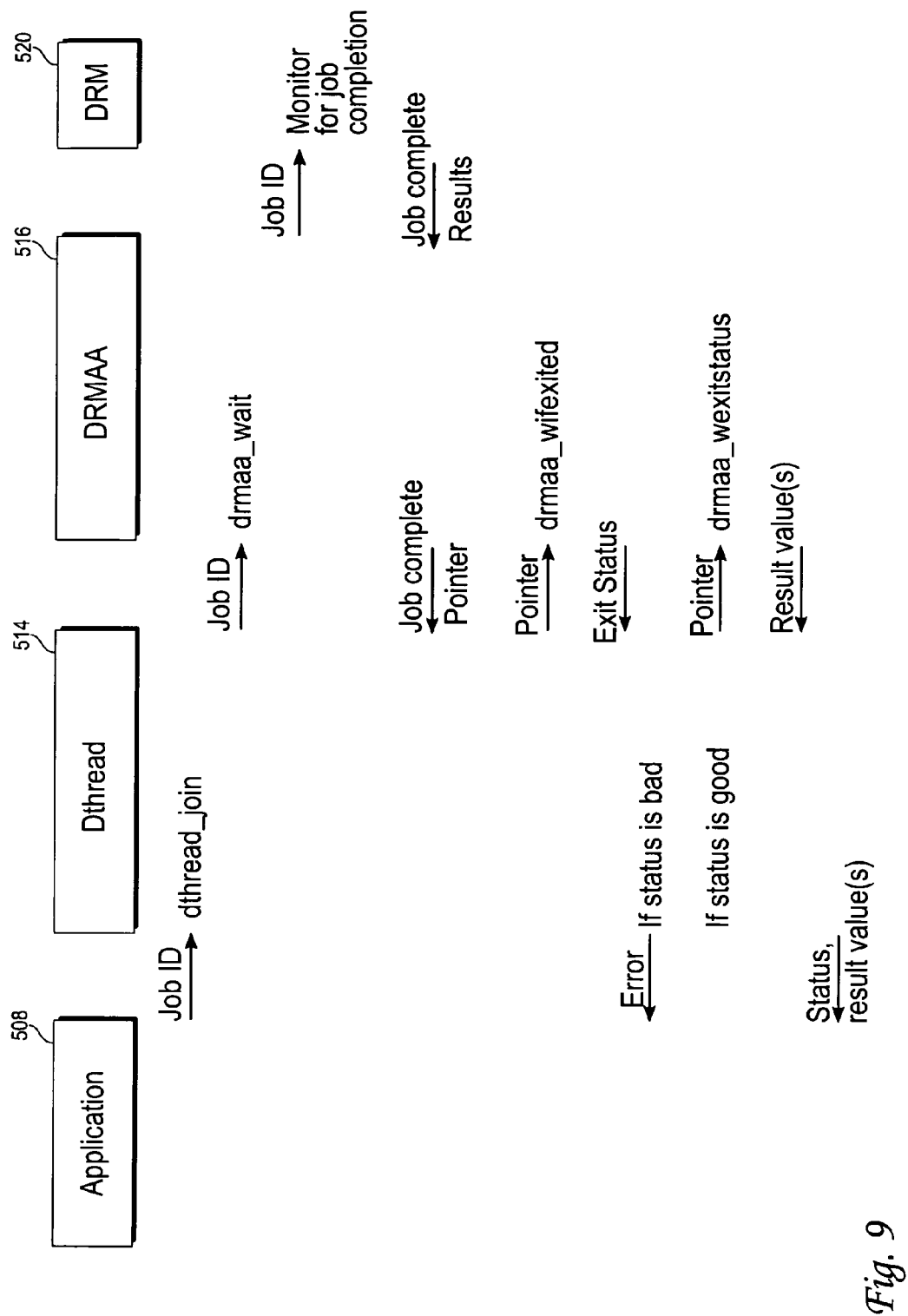
FIG. 9 shows a sample implementation of the dthread_join method of the dthread library, in accordance with one embodiment of the present invention.

At some point, the application 508 may wish to obtain the results of the execution of the set of code. To do so, the application 508 calls the dthread_join method of the dthread library 514, and provides the job ID (see FIG. 9). In response, the dthread_join method, in one embodiment, invokes several methods of the DRMAA library 516. First, it invokes the drmaa_wait method, and provides the job ID. In response to this invocation, the drmaa_wait method submits a request (which includes the job ID) to the DRM 520 to monitor the status of the job. The drmaa_wait method will wait until the job completes execution. When the job is completed, the DRM 520 sends a "job complete" notification and a set of execution results to the drmaa_wait method. In turn, the drmaa_wait method creates a results data structure in the client computer 502 and stores the execution results therein. In addition, the drmaa_wait method returns a "job complete" notification and a pointer to the results data structure to the dthread_join method.

Upon receiving the "job complete" notification and the pointer to the results data structure, the dthread_join method invokes the drmaa_wifexited method to obtain the exit status of the job (e.g. whether the job completed successfully or encountered an error). As part of this invocation, the dthread_join method provides the pointer to the results data structure. Using the pointer, the drmaa_wifexited method accesses the results data structure, obtains the exit status of the job therefrom, and returns the exit status to the dthread_join method.

At this point, the dthread_join method performs a check on the exit status. If the exit status indicates that the job encountered an error, and hence, did not complete successfully, then it returns an error message to the application 508. On the other hand, if the exit status indicates that the job completed successfully, then the dthread_join method invokes the drmaa_wexitstatus method to obtain a set of one or more execution result values. Included in this invocation is the pointer to the results data structure. Using the pointer, the drmaa_wexitstatus method accesses the results data structure, obtains the one or more execution result values therefrom, and returns it/them to the dthread_join method. Thereafter, the dthread_join method returns to the application 508 with the execution status and the set of one or more result values. In this manner, the application 508 is able to obtain the results of the execution of the set of code without ever knowing that the set of code was executed on a grid.

Figure 10:
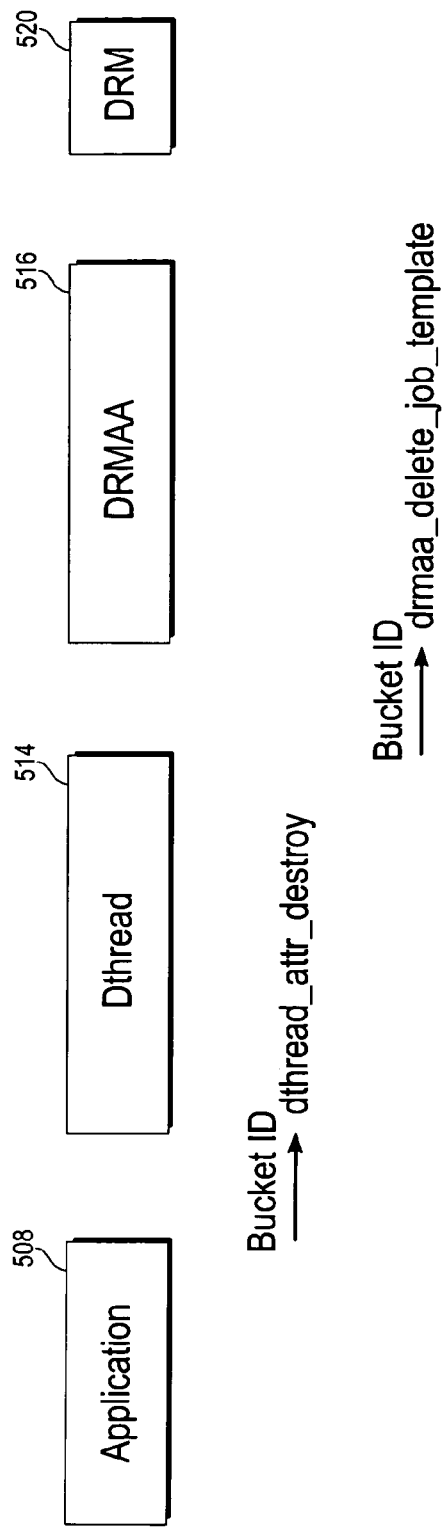
FIG. 10 shows a sample implementation of the dthread_attr_destroy method of the dthread library, in accordance with one embodiment of the present invention.

After obtaining the results of the execution of the set of code, the application 508 may wish to perform some cleanup. To do so, the application 508 calls the dthread_attr_destroy method of the dthread library 514, and provides the bucket ID (see FIG. 10). In response, the dthread_attr_destroy method invokes the drmaa_delete_job_template method of the DRMAA library 516. As part of this invocation, the dthread_attr_destroy method provides the bucket ID. In response, the drmaa_delete_job_template method destroys the bucket that was used to store the attribute and other information for the job, and frees the memory for reuse by other entities.

In the manner described, the dthread library 514 enables the application 508 to take advantage of the computing grid 504 without ever being aware of the existence of the grid 504.

Alternative Embodiment(s)

In the embodiment of the dthread library 514 described thus far, the methods of the dthread library 514 invoke the methods of the DRMAA library 516. As an alternative, the methods of the dthread library 514 may be programmed with sufficient logic that they implement all of the functionalities that are performed by the methods of the DRMAA library 516. If this is done, then there will be no need to invoke the methods of the DRMAA library 516. This and other embodiments are within the scope of the present invention.

Hardware Overview

Figure 11:
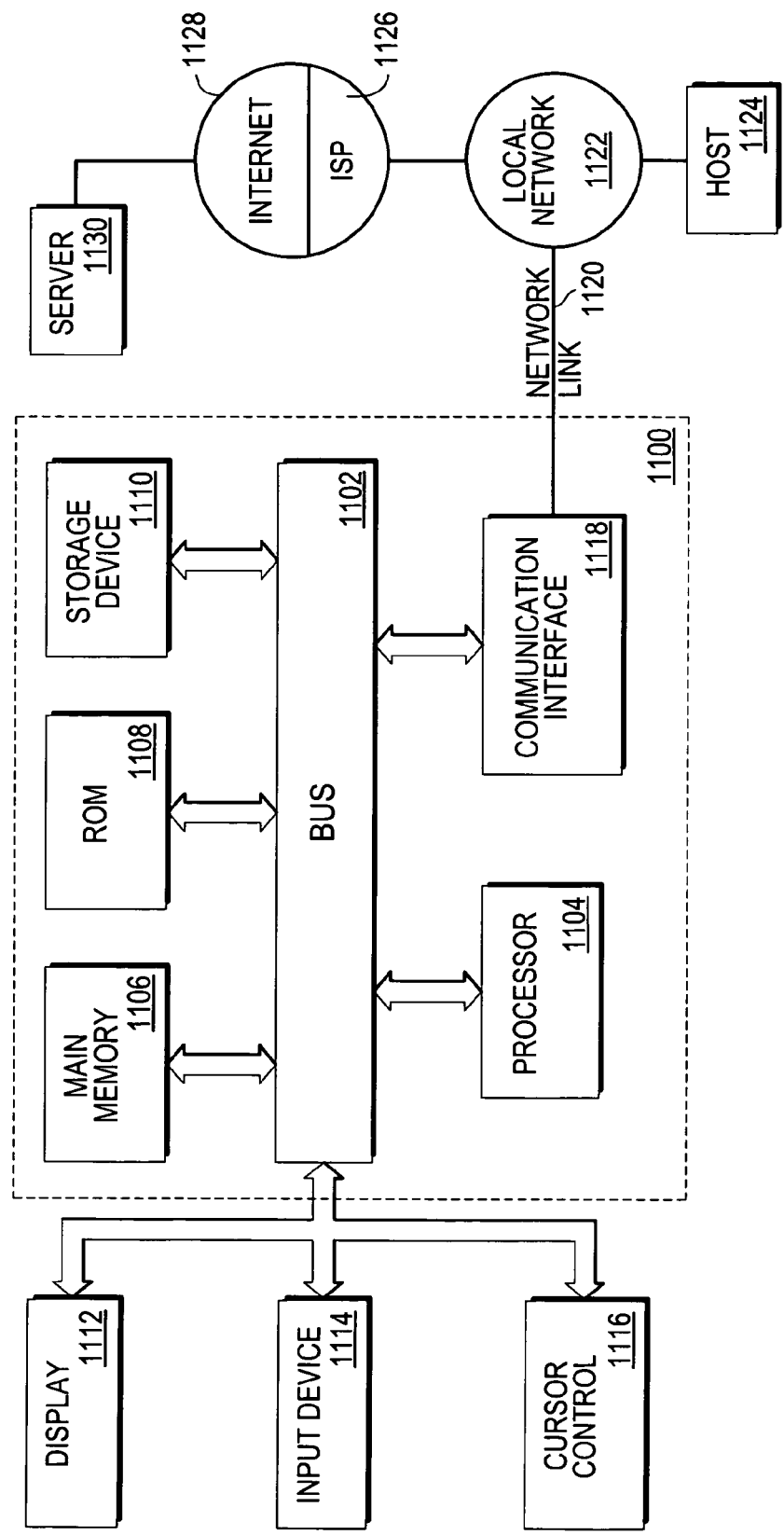
FIG. 11 is a block diagram of a general purpose computer system in which one embodiment of the present invention may be implemented.

In one embodiment, the dthread library 514 is implemented as one or more sets of instructions that are executed by one or more processors. FIG. 11 is a block diagram of a computer system 1100 upon which an embodiment of the dthread library 514 may be executed. Computer system 1100 may be used to implement the client computer 502, the resource computers 522, or any other computer in the system of FIG. 5.

Computer system 1100 includes a bus 1102 for facilitating information exchange, and one or more processors 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions by processor 1104. Computer system 1100 may further include a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112 for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

In computer system 1100, bus 1102 may be any mechanism and/or medium that enables information, signals, data, etc., to be exchanged between the various components. For example, bus 1102 may be a set of conductors that carries electrical signals. Bus 1102 may also be a wireless medium (e.g. air) that carries wireless signals between one or more of the components. Bus 1102 may further be a network connection that connects one or more of the components. Any mechanism and/or medium that enables information, signals, data, etc., to be exchanged between the various components may be used as bus 1102.

Bus 1102 may also be a combination of these mechanisms/media. For example, processor 1104 may communicate with storage device 1110 wirelessly. In such a case, the bus 1102, from the standpoint of processor 1104 and storage device 1110, would be a wireless medium, such as air. Further, processor 1104 may communicate with ROM 1108 capacitively. Further, processor 1104 may communicate with main memory 1106 via a network connection. In this case, the bus 1102 would be the network connection. Further, processor 1104 may communicate with display 1112 via a set of conductors. In this instance, the bus 1102 would be the set of conductors. Thus, depending upon how the various components communicate with each other, bus 1102 may take on different forms. Bus 1102, as shown in FIG. 11, functionally represents all of the mechanisms and/or media that enable information, signals, data, etc., to be exchanged between the various components.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another machine-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any non-transitory medium that participates in providing data that causes a machine to operation in a specific fashion. In an embodiment implemented using computer system 1100, various machine-readable media are involved, for example, in providing instructions to processor 1 104 for execution. Such a medium may take many forms, such as nonvolatile media and volatile media. Non-volatile media includes, for example, optical or magnetic disks, such as storage device 1110. Volatile media includes dynamic memory, such as main memory 1106.

Common forms of machine-readable media include, for example, a floppy disk, a flexible disk, hard disk, magnetic tape, or any other magnetic medium, a CDROM, DVD, or any other optical storage medium, a RAM, a PROM, and EPROM, a FLASH-EPROM, any other memory chip or cartridge, or any other non-transitory medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its memory. The instructions may optionally be stored on storage device 1110.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented within a client computer to enable the client computer to interact with a computing grid, wherein the computing grid comprises a plurality of resource computers and a distributed resource manager (DRM), wherein the DRM coordinates assignment of jobs to the plurality of resource computers, and wherein the method, comprises:

receiving, from a grid-unaware application executing within the client computer, a request to create a new thread within the client computer to execute a set of code concurrently with the grid-unaware application;

in response to the request to create the new thread, invoking a resource management interface to cause the resource management interface to interact with the DRM to cause the DRM to:
  create a new job which entails execution of the set of code in place of the new thread,
  assign the new job to a particular resource computer of the plurality of resource computers to be executed thereon, such that the set of code is executed on the particular resource computer instead of on the client computer, and
  receive a set of execution results which were generated by the particular resource computer as a result of executing the set of code, when a request from the grid-unaware application to join the new thread is received,
  wherein the new thread is not created within the client computer to execute the set of code.

2. The method of claim 1, wherein the grid-unaware application is unaware that the set of code is not being executed on the client computer.

3. The method of claim 1, wherein the grid-unaware application is under an impression that a new thread was created within the client computer to execute the set of code, and wherein the method further comprises:
  obtaining the set of execution results from the resource management interface; and
  providing the set of execution results to the grid-unaware application.

4. The method of claim 1, wherein the resource management interface resides on the client computer.

5. The method of claim 1, wherein the resource management interface is an application programming interface (API) configured under a job-oriented paradigm.

6. A method implemented within a client computer to enable the client computer to interact with a computing grid, wherein the computing grid comprises a plurality of resource computers and a distributed resource manager (DRM), wherein the DRM coordinates assignment of jobs to the plurality of resource computers, and wherein the method comprises:
  receiving, from a grid-unaware application executing within the client computer, a request to create a new thread within the client computer to execute a set of code concurrently with the grid-unaware application;
  in response to the request to create the new thread, interacting with the DRM to cause the DRM to:
    create a new job which entails execution of the set of code in place of the new thread, and
    assign the new job to a particular resource computer of the plurality of resource computers to be executed thereon, such that the set of code is executed on the particular resource computer instead of on the client computer; and
    receive a set of execution results which were generated by the particular resource computer as a result of executing the set of code, when a request from the grid-unaware application to join the new thread is received,
    wherein the new thread is not created within the client computer to execute the set of code.

7. The method of claim 6, wherein the grid-unaware application is unaware that the set of code is not being executed on the client computer.

8. The method of claim 6, wherein the grid-unaware application is under an impression that a new thread was created within the client computer to execute the set of code, and wherein the method further comprises:
  providing the set of execution results to the application.

9. A machine readable medium comprising instructions for causing one or more processors of a client computer to interact with a computer grid, wherein the computing grid comprises a plurality of resource computers and a distributed resource manager (DRM), wherein the DRM coordinates assignment of jobs to the plurality of resource computers, and wherein the machine readable medium comprises:
  instructions for causing one or more processors to receive, from a grid-unaware application executing within the client computer, a request to create a new thread within the client computer to execute a set of code concurrently with the grid-unaware application;
  instructions for causing one or more processors to invoke, in response to the request to create the new thread, a resource management interface to cause the resource management interface to interact with the DRM to cause the DRM to:
    create a new job which entails execution of the set of code in place of the new thread, and
    assign the new job to a particular resource computer of the plurality of resource computers to be executed thereon, such that the set of code is executed on the particular resource computer instead of on the client computer; and
    receive a set of execution results which were generated by the particular resource computer as a result of executing the set of code, when a request from the grid-unaware application to join the new thread is received,
    wherein the new thread is not created within the client computer to execute the set of code.

10. The machine readable medium of claim 9, wherein the grid-unaware application is unaware that the set of code is not being executed on the client computer.

11. The machine readable medium of claim 9, wherein the grid-unaware application is under an impression that a new thread was created within the client computer to execute the set of code, and wherein the machine readable medium further comprises:
  instructions for causing one or more processors to obtain the set of execution results from the resource management interface; and
  instructions for causing one or more processors to provide the set of execution results to the grid-unaware application.

12. The machine readable medium of claim 9, wherein the resource management interface resides on the client computer.

13. The machine readable medium of claim 9, wherein the resource management interface is an application programming interface (API) configured under a job-oriented paradigm.

14. A machine readable medium comprising instructions for causing one or more processors of a client computer to interact with a computing grid, wherein the computing grid comprises a plurality of resource computers and a distributed resource manager (DRM), wherein the DRM coordinates assignment of jobs to the plurality of resource computers, and wherein the machine readable medium comprises:
  instructions for causing one or more processors to receive, from a grid-unaware application executing within the client computer, a request to create a new thread within the client computer to execute a set of code concurrently with the grid-unaware application;

instructions for causing one or more processors to interact, in response to the request to create the new thread, with the DRM to cause the DRM to:
  create a new job which entails execution of the set of code in place of the new thread, and
  assign the new job to a particular resource computer of the plurality of resource computers to be executed thereon, such that the set of code is executed on the particular resource computer instead of on the client computer; and
  receive a set of execution results which were generated by the particular resource computer as a result of executing the set of code, when a request from the grid-unaware application to join the new thread is received, wherein the new thread is not created within the client computer to execute the set of code.

15. The machine readable medium of claim 14, wherein the grid-unaware application is unaware that the set of code is not being executed on the client computer.

16. The machine readable medium of claim 14, wherein the grid-unaware application is under an impression that a new thread was created within the client computer to execute the set of code, and wherein the machine readable medium further comprises:
  instructions for causing one or more processors to provide the set of execution results to the grid-unaware application.

\* \* \* \* \*